(12) United States Patent
Grönvall (10) Patent No.: US 11,833,453 B2
(45) Date of Patent: Dec. 5, 2023

(54) FILTER PRESS AND METHOD FOR SEPARATING THE SOLID COMPONENTS FROM THE LIQUID COMPONENTS OF A SLURRY

(71) Applicant: Metso Sweden AB, Trelleborg (SE)

(72) Inventor: Lars Grönvall, Trelleborg (SE)

(73) Assignee: Metso Sweden AB, Trelleborg (SE)

( * ) Notice: Subject to any disclaimer, the term of this patent is extended or adjusted under 35 U.S.C. 154(b) by 899 days.

(21) Appl. No.: 16/756,265

(22) PCT Filed: Oct. 18, 2018

(86) PCT No.: PCT/EP2018/078590
§ 371 (c)(1),
(2) Date: Apr. 15, 2020

(87) PCT Pub. No.: WO2019/077055
PCT Pub. Date: Apr. 25, 2019

(65) Prior Publication Data
US 2020/0316499 A1    Oct. 8, 2020

(30) Foreign Application Priority Data

Oct. 18, 2017   (EP) .................................. 17197183

(51) Int. Cl.
*B30B 9/06* (2006.01)
*B01D 25/127* (2006.01)
(Continued)

(52) U.S. Cl.
CPC ..... *B01D 25/1275* (2013.01); *B01D 25/1645* (2013.01); *B30B 1/18* (2013.01);
(Continued)

(58) Field of Classification Search
CPC .. B30B 1/18; B30B 1/185; B30B 1/24; B30B 9/045; B30B 9/06; B01D 25/12;
(Continued)

(56) References Cited

U.S. PATENT DOCUMENTS 3,404,580 A * 10/1968 Valenti ................ F16H 25/2056
74/89.35
3,981,802 A * 9/1976 Schotten ............ B01D 25/1275
210/231
(Continued)

FOREIGN PATENT DOCUMENTS

CN     206444260 U    8/2017
DE     1411745 A1    3/1969
(Continued)

OTHER PUBLICATIONS

Search Report for Russian Federation Application No. 2020115248/04, search conducted Dec. 9, 2021.
(Continued)

*Primary Examiner* — Jimmy T Nguyen
(74) *Attorney, Agent, or Firm* — Andrus Intellectual Property Law, LLP (57) ABSTRACT

A filter press is disclosed for separating solid components from liquid components of a slurry. The filter press includes side beams and a plurality of filter plates oriented at right angles to the longitudinal direction of the side beams. The filter plates are adapted to move along the side beams. A stationary end is arranged on one end of the side beams and a movable head is adapted to transport the filter plates along the side beams. The filter press includes a press system adapted to exert a closing pressure on the filter plates to press the filter plates against each other. The press system further includes at least one electrically driven actuator adapted to generate an axially directed force on the filter plates by the movable head. The disclosure also relates to a method for separating the solid components from the liquid components of a slurry.

34 Claims, 8 Drawing Sheets

(51) Int. Cl.
  *B01D 25/164* (2006.01)
  *B30B 1/18* (2006.01)
  *B30B 1/24* (2006.01)
  *B01D 25/19* (2006.01)
(52) U.S. Cl.
  CPC .................. *B30B 1/24* (2013.01); *B30B 9/06* (2013.01); *B01D 25/19* (2013.01)
(58) Field of Classification Search
  CPC .............. B01D 25/1275; B01D 25/164; B01D 25/1645; B01D 25/19; B01D 25/322; B01D 25/343
  See application file for complete search history.

(56) References Cited

U.S. PATENT DOCUMENTS 4,855,062 A * 8/1989 Oelbermann .......... B01D 25/19
  210/228
2005/0268736 A1* 12/2005 Gaechter ............. F16H 25/2228
  74/89.23

FOREIGN PATENT DOCUMENTS

| | | |
|---|---|---|
| EA | 201101198 A1 | 1/2012 |
| GB | 2064973 A | 6/1981 |
| JP | H0463107 A | 2/1992 |
| JP | 2001104714 A | 4/2001 |
| JP | 2012061473 A | 3/2012 |
| RU | 39503 U1 | 8/2004 |
| SU | 324042 A1 | 12/1971 |
| SU | 1662616 A1 | 7/1991 |
| WO | 2009079673 A1 | 7/2009 |

OTHER PUBLICATIONS

International Search Report and Written Opinion for International Application No. PCT/EP2018/078590 dated Jan. 25, 2019.
International Preliminary Report on Patentability or International Application No. PCT/EP2018/078590 dated Feb. 5, 2020.
Translation of Office Action for corresponding Chinese Patent Application No. 2018800682011 dated Jun. 18, 2021.

* cited by examiner

FILTER PRESS AND METHOD FOR SEPARATING THE SOLID COMPONENTS FROM THE LIQUID COMPONENTS OF A SLURRY

CROSS-REFERENCE TO RELATED APPLICATIONS

This application is the U.S. national stage application of International Application PCT/EP2018/078590, filed Oct. 18, 2018, which international application was published on Apr. 25, 2019, as International Publication WO 2019/077055 A1 in the English language. The International Application claims priority of European Patent Application No. 17197183.1 filed Oct. 18, 2017.

TECHNICAL FIELD

The invention relates to a filter press and a method for separating the solid components from the liquid components of a slurry.

BACKGROUND ART OF THE INVENTION

One method of filtering slurries having relatively high concentrations of solid matter uses an apparatus known as a filter press, which operates under a displacement filtering principle. The filter press utilizes a series of filter plates which are placed adjacent to one another and a closing pressure is exerted on the filter plates sealing them tightly together. Slurry such as mineral slurry or pulp is introduced through an inlet to fill all of the individual spaces, the filter chambers, between each pair of filter plates and a part of the liquid component, the filtrate is expelled. The filter membranes of the filter chambers are then activated to compress the filter cakes. Then, compressed air or gas or liquid is introduced to drive out more liquid component by displacement, whereby the solid particulate matter is retained. The filtrate is led to an outlet where it is discharged. The solid particulate cake remaining in each individual space after the filter cycle must be removed in preparation for a subsequent filter cycle.

Conventional filter presses are typically configured with hydraulic cylinders for transport and closing of the filter presses. Document WO2009/079673 describes such a filter press having filter plates, a pressure plate that can be moved by means of a hydraulic cylinder mounted on a separate sliding carriage and which presses the filter plates against one another during the filtration process. The sliding carriage can be moved by means of a drive unit mounted on the sliding carriage thereby opening and closing the filter plate assembly.

The document DE 1411745 A1 "Improvements in or relating to presses" explains a filter press having a movable pressure plate which is adjustable my means of a threaded spindle which is operated by a hand wheel.

SUMMARY OF THE INVENTION

One object of the present invention is to provide an improvement of the above technique and prior art. More particularly, it is an object of this invention to provide an improved filter press which is environmentally sustainable and energy efficient.

Additional objectives, and/or advantages that will be apparent to one skilled in the art from the following description of embodiments, are achieved, in full or at least in part, by a filter press for separating the solid components from the liquid components of a slurry according to the present invention. While the invention is described below, it should be apparent that the invention may be not limited to the specifically described details. One skilled in the art, having access to the teachings herein, will recognize additional applications, modifications and incorporations in other areas, which are within the scope of the invention.

The filter press for separating the solid components from the liquid components of a slurry according to the invention comprises side beams and a plurality of filter plates oriented at right angles to the longitudinal direction of the side beams wherein said filter plates are adapted to move along said side beams, a stationary end arranged on one end of the side beams, and a movable head adapted to transport said filter plates along the side beams. The filter press also comprises a press system adapted to exert a closing pressure on said filter plates to press the filter plates against each other. The press system comprises at least one electrically driven actuator adapted to generate an axially directed force which is exerted on the filter plates by means of the movable head.

This means that the closing operation of the filter press is driven electrically and no hydraulic cylinders are required to perform the filtration process in comparison to conventional filter presses where hydraulic cylinders are used for the transport of the filter plates and the exertion of closing pressure on the same.

In conventional filter presses the amount of oil required to operate the hydraulic cylinders is excessive during the transport of the filter plates since they are equipped with the same power along the entire stroke. Furthermore, the usage of large quantities of oil is not good for the environment, the hydraulic oil is costly and the handling of the oil requires additional work. Moreover, in case of oil leakage, the end product, the filter cakes, may be contaminated.

Therefore, the filter press according to the invention is particularly advantageous in that it does not require any oil and is therefore environmentally sustainable.

In conventional filter presses the procedure of opening and closing of the filter plate assembly also takes considerable time since large quantities of oil have to be pumped through tubes and pipes to supply the cylinders. In particular, opening and closing of the filter plate assembly using the closing cylinder takes considerable time because the closing cylinder is designed for high closing pressure, but not for rapid piston movement. Furthermore, if the closing cylinder is used for opening the filter plate assembly, the press volume is limited because only one limited cylinder stroke can be realized. A long cylinder stroke also necessitates large quantities of oil and exposes large areas of the closing cylinder piston rod to contamination from falling filter cake. Moreover, a long piston renders mechanical challenges since the weight of the piston may result in deflection or bending of the piston.

However, in the filter press according to the invention both the transport of the filter plates and the closing operation of the filter plates are electrically driven, therefore the cycle time for completing a full work cycle is significantly reduced. This is due to that the movable head is driven by a separate drive unit, an electrical motor, which allows for higher speeds when transporting the filter plates between the open position where the filter plates are emptied and the closed position and vice versa. In particular, the speed of the movable head may be adjustable and variable such that the movable head can be transported along the side beams with different speed depending on the circumstances. Furthermore, substantial energy savings can be achieved in comparison to conventional filter presses since both the movable head and the press system are electrically driven. Another advantage with the filter press according to the invention is that the number of filter plates may be almost unlimited. This is because the transport of the filter plates is performed by the movable head which is connected to the drive unit by linear mechanical transmission which allows that the movable head moves with high speed along the side beams.

Since the drive unit comprises an electrical motor the supplied power and transport speed can easily be adapted to the number of filter plates in comparison to conventional filter presses where hydraulic cylinders with limited power are used for transporting the filter plates.

The press system may further comprise that said actuator is adapted to convert rotary drive into an axially directed force. In particular, said actuator may be adapted to convert rotary drive into an axially directed pulling force or an axially directed pushing force. In one mode of operation of the press system, said axially directed force may be a pulling force exerted on the movable plate to close the filter plate assembly. In another mode of operation of the press system the axially directed force may be a push force exerted on the movable plate to open the filter plate assembly.

The press system may further comprise that the actuator comprises a planetary screw assembly. The planetary screw assembly comprises a threaded planetary screw shaft and a planetary nut adapted to interact with the planetary screw shaft. The threaded shaft is directed along the longitudinal direction of the filter press. A planetary screw assembly converts rotational motion into linear motion and is particularly suitable to be used in high-precision, high-speed, heavy-load, long-life and heavy-use applications such as a filter press. Thus a rotary drive applied to the main threaded shaft is converted into an axially directed force. The actuator, the planetary screw assembly, exerts a pulling pressure on the filter plates by means of the press plate attached to the movable head, which presses the filter plates against each other, in response to rotary drive of the threaded main shaft. The necessary closing pressure can thus be achieved by electrical drive means instead of hydraulic cylinders.

The press system may further comprise that the actuator comprises a planetary screw assembly connected to the stationary end of the filter press.

In one embodiment of the filter press may the planetary screw shaft be arranged in a fixed position in the longitudinal direction of the filter press and the planetary nut may be arranged to be movable, displaceable, in the longitudinal direction along the shaft. The planetary shaft is then electrically driven to rotate but does not move in the axial direction. Instead the planetary nut is displaced in the axial direction of the planetary screw shaft in response to rotary drive of the threaded planetary screw shaft. In this embodiment the planetary nut may be arranged to be non-rotatable when the press system is in operation. The planetary nut may be prevented from rotation by means of a fixing member connected to the frame and/or by means of the locking system.

In one embodiment of the filter press the planetary nut may be arranged in a fixed position in the longitudinal direction of the filter press and the planetary screw shaft may be arranged to be movable, displaceable, in the longitudinal direction. In this embodiment the planetary nut is electrically driven to rotate but does not move in the longitudinal direction. In this embodiment the planetary nut may be attached to the stationary end of the filter press. The planetary screw shaft is instead displaced in the longitudinal direction in response to rotary drive of the planetary nut. In this the embodiment the threaded planetary screw shaft is arranged to be non-rotating when the press system is in operation. The planetary screw shaft may be prevented from rotating by means of a fixing member connected to the frame and/or by means of the locking system.

The filter press may comprise that the planetary screw shaft may be arranged in a fixed position in the longitudinal direction of the filter press and the planetary nut may be arranged to be movable along the shaft in the longitudinal direction. In this case the planetary screw assembly may be arranged in a position between the stationary end and the movable head of the filter press. The planetary nut may be connected to the side beam or the frame of the filter press. The planetary nut may be adapted to be electrically driven to rotate by means of electrical driving means that may be connected to the press frame adjacent the planetary nut. In this embodiment the threaded planetary screw shaft may be arranged to be non-rotating when the press system is in operation. The planetary screw shaft may be prevented from rotating by means of a fixing member connected to the frame or by means of the locking system.

In one embodiment of the filter press the planetary screw assembly may comprise a planetary roller screw assembly. The planetary roller screw assembly comprises a main threaded planetary shaft and a planetary roller nut having an arrangement of rollers adapted to interact with the threaded planetary screw shaft such that the planetary roller nut is displaced in the axial direction of the threaded shaft in response to rotary drive of the threaded main shaft. Preferably, the planetary roller nut is prevented from rotating with the planetary shaft. The moving direction of the planetary nut is determined by the direction of rotation of the main threaded shaft. Because of the number of threaded rollers which surround the main threaded shaft and which are in continuous contact with the shaft, the actuating force derived from driving the shaft is applied on a greater surface area, thus a large amount of thrust is provided to effectively close the filter press. A very high closing pressure may therefore be achieved by the press system described herein. The filter plates arranged between the stationary end and the movable head are thus tightly sealed together.

In one embodiment of the filter press the planetary screw assembly may comprise a planetary ball screw assembly. The ball screw assembly comprises a planetary ball nut having an arrangement of balls adapted to interact with the threaded planetary screw shaft. The ball screw assembly functions in the same manner as the planetary roller screw assembly.

In one embodiment of the filter press the press system may further comprise an extension member fixedly connected to the actuator. The extension member may further be connected to the locking system.

In another embodiment of the filter press, the extension member may be fixedly connected to the locking system and releasably connected to the actuator of the press system.

The filter press may further comprise that the extension member is disposed between the actuator and the locking system, in order to transmit the axially directed force generated by the actuator to the movable head and the filter plates via the locking system.

In one embodiment of the filter press the extension member is connected to the planetary nut in order to perform the same movement as the planetary nut.

The extension member may be configured as a longitudinally extended body. The extension member may also comprise several components coupled together to form a connection between the press system and the locking system. The components may be releasably coupled to each other. The body of the extension member may be configured as a cylindrically formed shell or a partly solid component. The body may comprise other peripheral cross section such as square or octagonal. Preferably the extension member is concentrically arranged with the planetary screw shaft. Preferably the extension member extends from the planetary nut towards the locking system (further described below) which may be arranged on the movable head or the stationary end.

The filter press may further comprise that the extension member is arranged to be displaceable in the longitudinal direction together with the planetary nut. When the planetary nut is displaced along the threaded planetary shaft, the extension member is also moved in the same direction. Accordingly, the axial position of the extension element in relation to the main threaded shaft can be adjusted by rotating the main threaded shaft in the appropriate direction.

The filter press may further comprise that the extension member is arranged to rotate together with the planetary nut. In this case the planetary shaft is not rotating. The planetary nut may then be displaced along the threaded planetary shaft and the extension member is also moved in the same direction.

One embodiment of the filter press may further comprise means for preventing the planetary nut from rotating. In case an extension member is connected to the planetary nut, the means for preventing rotation of the planetary nut may be arranged to act also on the extension member.

The means for preventing the planetary nut from rotating with the shaft may comprise a fixing member attached to the frame. The fixing member is further adapted to be connected to the planetary nut or the extension member. The fixing member is preferably adapted to permit axial displacement of the planetary nut and the extension member along the axial direction the planetary shaft.

The filter press may further comprise that the planetary nut, and the extension member, are prevented from rotating by the locking system since the locking device may be adapted to perform a locking action with the locking element which does not permit rotation of the locking element.

The press system may comprise at least one electrical drive means wherein said at least one actuator is driven by said at least one electrical drive means. The press system may comprise at least two, three, four, five, six or more actuators. Preferably at least one actuator is disposed on at least one vertical side of the filter plate assembly. Preferably at least one actuator is disposed on each vertical side of the filter plate assembly. However, it is also possible to arrange the actuators above and/or below the filter plates assembly.

The press system may comprise electrical driving means in correspondence with the number of actuators. However, a single electrical driving means may also drive several actuators. The press system may comprise at least two actuators and at least two electrical drive means, whereby each actuator is adapted to be driven separately. In one embodiment of the filter press, at least two actuators are electrically driven to exert forces of different magnitude on the filter plates. The filter plates may then be tilted or oriented in a non-vertical direction or offset in the longitudinal direction along the side beams in correspondence to the exerted forces. This is advantageous in that different magnitude of power can easily be applied to the actuators. Thereby it is possible to adjust the speed of each actuator individually and by that improve cycle time and ensure optimum and/or equal pressure in the closed stage.

The filter press may further comprise that at least two actuators are electrically driven to exert equal forces on the filter plates. The filter plates are then moved equally along each of the side beams.

In one embodiment of the filter press the press system may be mounted on the stationary end. In this embodiment the actuator is connected to the stationary end and is directed in the longitudinal direction towards the movable head. The stationary end comprises the at least one electrical drive means to drive the at least one actuator. This is advantageous in that the drive means for generating the closing pressure are stationary and the closing pressure exerted by the press system can be efficiently applied to the filter plates. In this embodiment the movable head comprises the locking device.

In one embodiment of the filter press the press system may be mounted on the movable head. In this embodiment the actuator is connected to the movable head and is directed towards the stationary end. In this embodiment the movable head comprises the electrical drive means to drive the actuator. In this embodiment the stationary end comprises the locking device.

The filter press may further comprise a movable head comprising a carriage and a press plate directed towards the filter plate assembly, wherein said carriage is adapted to move along the side beams by means of a drive unit and a linear transmission. With this simple arrangement, the movable head can travel at high and adjustable speeds and transport a large number of filter plates along the side beams.

The drive unit may comprise an electrical motor and gearbox. The filter press may further comprise that the linear transmission comprises at least one gear wheel adapted to mesh with at least one toothed rack.

The filter press may further comprise that the at least one gear wheel is mounted on the carriage and the at least one toothed rack is mounted on the frame.

One embodiment of the filter press may comprise that the drive unit is arranged on the carriage such that the drive unit moves with the carriage. In this embodiment the at least one toothed rack may be mounted on a side beam of the frame and the at least one gear wheel is connected to the gearbox and electrical motor. When the drive unit is operation the gear wheel meshes with the stationary toothed rack to move the carriage along the side beams.

One embodiment of the filter press may comprise that the at least one gear wheel is fixed, mounted on the frame and the at least one toothed rack is mounted on the carriage, such that the toothed rack is displaced with the carriage.

One embodiment of the filter press may comprise that the drive unit is stationary arranged in the press frame and only the press plate is moved by the carriage. In this embodiment the at least one toothed rack is mounted fixed on the carriage in order to be movable with the carriage and the gear wheel is fixed mounted on the press frame to be connected to the drive unit. One end of the at least one toothed rack may be mounted to the carriage and the other end of the at least one toothed rack is arranged to interact with the gear wheel connected to the drive unit. When the drive unit is in operation the stationary gear wheel meshes with the movable toothed rack in order to move the carriage along the side beams. This is an advantageous configuration in that the carriage only carries the press plate, thus the carriage may be moved in a high and variable speed along the side beams.

The filter press may further comprise a locking system which is adapted to interconnect the movable head and the stationary end. The locking system is preferably adapted to lock the movable head into engagement with the press system. The locking system thereby locks the movable head and the filter press in an operating position. The filter plates are then arranged very close to each other, but not yet tight closed. The filter press may further comprise that the actuator is connected to the movable head, in order to transmit the axially directed force generated by the actuator to the movable head and the filter plates.

When the movable head has transported the filter plates to the operating position, the locking system is activated to lock the movable head into engagement with the press system. Thereafter activation of the press system is performed such that the pressure plate of the movable head and the filter plates are pulled towards the press system thereby exerting a closing pressure on the filter plates in order to tighten and seal the filter plate assembly.

The locking system may further comprise at least one locking element and at least one locking device, wherein said locking device is adapted to form a locking engagement with said locking element.

Since the locking system is active during the filtration process, the force exerted by the electrically driven actuator when the press system is in operation is transmitted to the movable head by means of the locking system such that the filter plates may be tightly sealed together between the stationary end and the movable head. A very high closing pressure may therefore be achieved by the press system according to the present invention.

One embodiment of the filter press may comprise that the locking element may be connected to the projecting end of the actuator of the press system. Alternatively, the locking element may be connected to the projecting end of the extension means connected to the actuator. In any case, the locking element may project towards a corresponding locking device adapted to cooperate with the locking element to achieve a locking action between them. The locking element may be configured as a longitudinally extending rod or bar. The locking element may comprise a notch or groove arranged on the outermost end of the locking element.

In one embodiment of the filter press the locking device may be mounted on the movable head. Preferably the locking device is attached on the side of the movable head directed away from the locking element. The locking device may comprise a clamp or similar.

When the moving head is moved towards the stationary end, the locking element is aligned with an opening, a through hole arranged in the movable head. The locking element is adapted to pass through the hole and to project from the hole on the opposite side of the movable head. Preferably the notch of locking element is aligned with the locking device. The locking device is adapted to engage with said locking element, for example by closing a clamp around the notch, and to form a secure and reliable a locking connection therewith.

In one embodiment of the filter press may the locking device be mounted on the stationary end. In this embodiment the movable head comprises at least one actuator and at least one locking element adapted to form a locking connection to the locking device mounted on the stationary end in a similar manner as described above.

In one embodiment of the filter press the locking system may be configured to prevent the planetary nut or the extension member from rotating when the press system is in operation. In this embodiment the locking element and the locking device are adapted to cooperate in a locking action thereby forming a secure and reliable locking connection which does not permit rotation of the locking element. This may for example be achieved by adapting the cross section of the notch on the locking element to a square cross section and adapting the cross section of the through hole in the movable head to the same cross section to achieve a locking action preventing rotation there between.

According to a second aspect, these and other objects are achieved, in full or at least in part, by a method for separating the solid components from the liquid components of a slurry using a filter press comprising a plurality of filter plates. The method comprises the steps placing said filter press in an operating position by transporting said filter plates towards a stationary end by a movable head, exerting a closing pressure on said filter plates by a press system that is adapted to press said filter plates against each other by electrically driving of at least one actuator adapted to generate an axially directed force which is exerted on the filter plates by means of the movable head, injecting slurry between the filter plates, and separating the solid components from the liquid components of the slurry located between the filter plates.

In the method according to the second aspect, the step of exerting a closing pressure on said filter plates may comprise converting rotary drive supplied by an electrical motor into an axially directed force.

In the method according to the second aspect, the step of exerting a closing pressure on said filter plates by the press system may comprise driving at least one planetary screw assembly by an electrical drive means in order to generate an axially directed force.

In the method according to the second aspect, the step of exerting a closing pressure on said filter plates may comprise displacing a planetary nut in the axial direction of a threaded planetary screw shaft in response to rotary drive of the planetary screw shaft in order to apply an axially directed force on the filter plates.

In the method according to the second aspect, the step of exerting a closing pressure on said filter plates may comprise displacing a planetary screw shaft in the axial direction relative to said planetary nut in response to rotary drive of the planetary nut in order to apply an axially directed force on the filter plates.

In the method according to the second aspect, the step of exerting a closing pressure on said filter plates may comprise electrically driving of at least two actuators, and exerting axially directed forces of equal magnitude on the filter plates by said actuators in order to close the filter plates.

In the method according to the second aspect, the step of exerting a closing pressure on said filter plates may comprise electrically driving of at least two actuators, and exerting axially directed forces of different magnitude on the filter plates by said actuators in order to close the filter plates.

The method according to the second aspect, may further comprise a step of locking the movable head in an operation position by a locking system prior to activation of the press system when the filtration process takes place.

The method according to the second aspect, may further comprise that the step of locking comprises forming a locking engagement between at least one locking element connected to the press system and at least one locking device attached to the movable head.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. As used herein, the term "comprising" and variations of that term are not intended to exclude other additives, components, integers or steps.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, and wherein.

DETAILED DESCRIPTION OF PREFERRED EMBODIMENTS OF THE INVENTION

Figure 1:
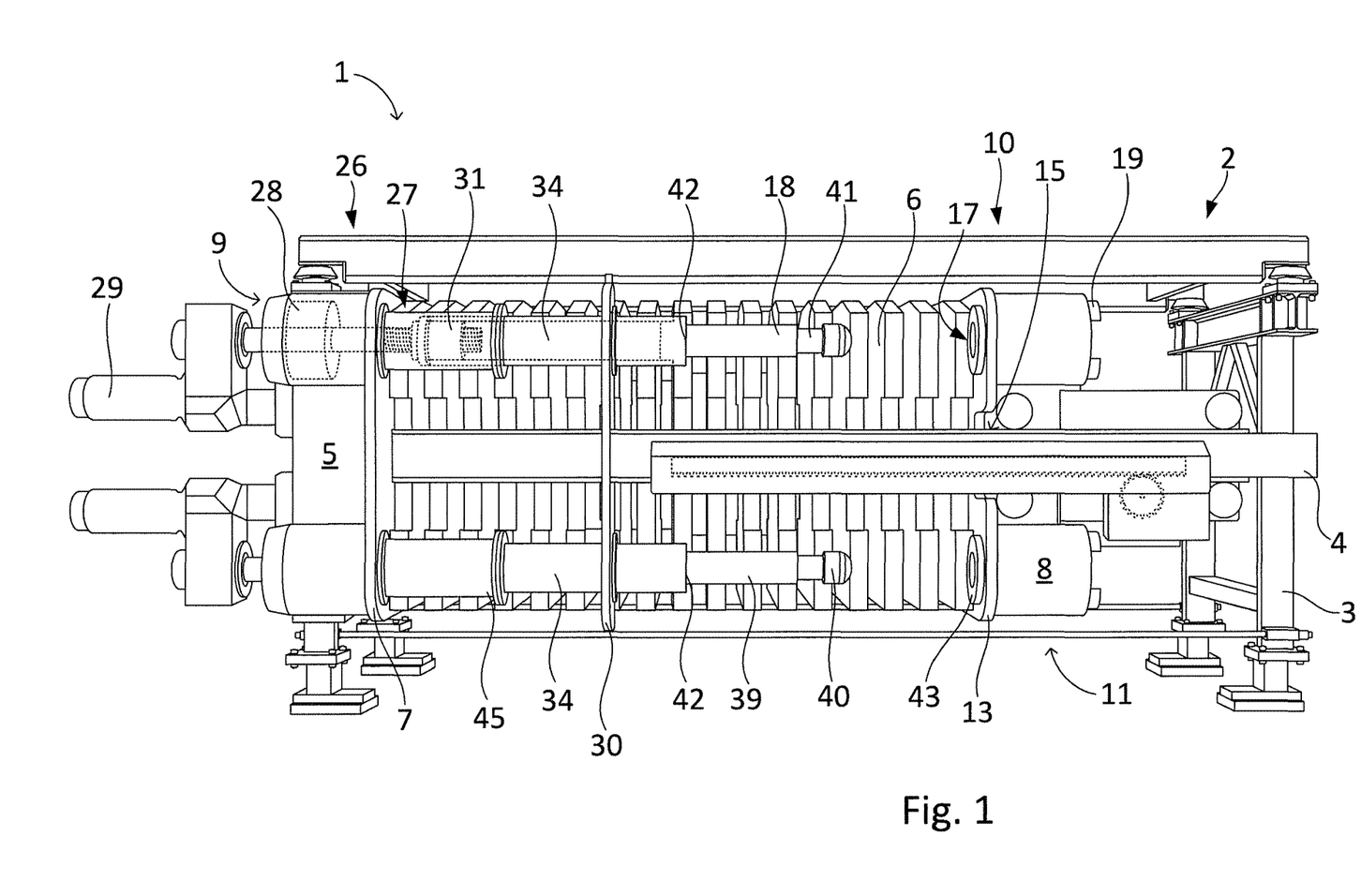
FIG. 1 illustrates a perspective view of a filter press according to one embodiment of the invention, when the filter plates are arranged at a distance from each other.

FIG. 1 illustrates a filter press 1 for separating the solid components from the liquid components of a slurry, preferably a mineral slurry or mineral pulp, according to one exemplary embodiment of the present invention.

The filter press comprises a press frame 2 having end columns 3 and longitudinally extended side beams 4 adapted to be connected to the end columns.

The filter press further comprises a stationary end 5 arranged at one end of the side beams 4. The stationary end 5 serves in particular to absorb the pressing and tensile forces occurring during manipulation of a filter plate assembly 6 and the filtration process. The stationary end comprises a stationary press plate 7 which abuts an outermost filter plate of the filter plate assembly 6.

The filter press comprises a series of filter plates, a plurality of face-to-face oriented filter plates movable on the side beams 4 in a longitudinal direction of said filter press 1. The series of filter plates is herein also referred to as a filter plate assembly 6 or filter pack.

The filter plate assembly 6 is arranged, located, between the stationary end 5 and a movable head 8. In this figure the filter plates are arranged at a distance from each other.

Supply lines 9 required for filtration in order to feed in the suspension to be filtered and carry away the filtrate are laid through the stationary end 5.

Figure 2:
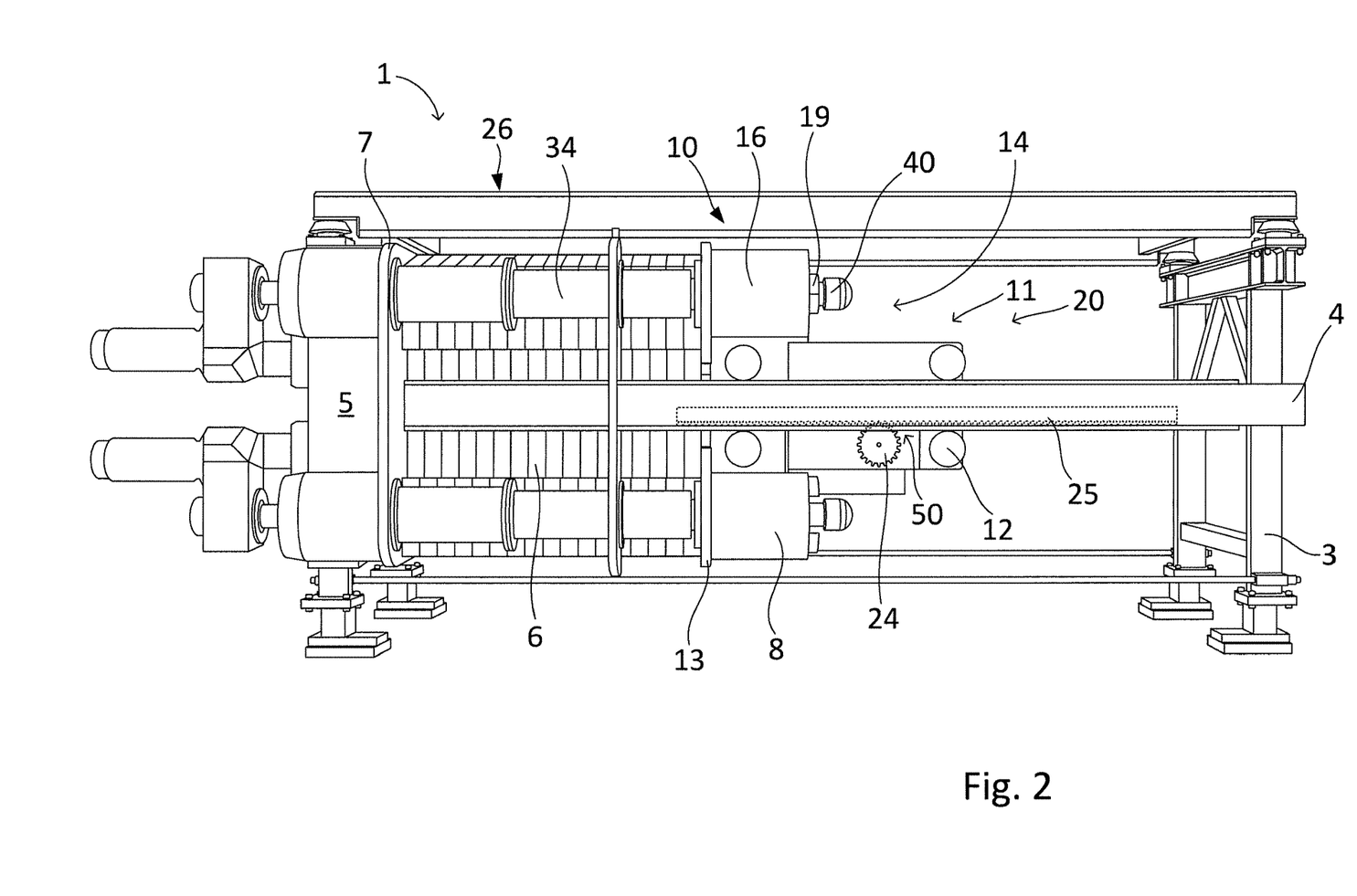
FIG. 2 illustrates a perspective view of the filter press, when the filter plates have been brought together.

FIG. 2 illustrates a perspective view of the filter press according to the embodiment shown in FIG. 1, where the filter plates have been brought together by the movable head 8 and is ready for being pulled together by the press system 26.

Each filter plate has a recess (not shown) on each one of its two side surfaces which creates a chamber (not shown) together with a corresponding recess of the side surface of a neighbouring filter plate, when the filter plates have been brought together by the movable head 8 and the filter press is being locked by the locking system 10 (FIG. 2).

Each filter plate further comprises an inlet for receiving the slurry from which the solid components are to be separated from the liquid components, and a plurality of outlets through which the liquid components can exit. The outermost filter plate arranged next to the movable head 8 is connected to the movable head, and all other filter plates are connected to this outermost filter plate, for example by chains. Thus, a movement of the movable head 8 in a direction away from the stationary end causes the filter plates to be pulled apart from one another (FIG. 1), and the filter cake typically drops down onto a chute (not shown in the figure) arranged for receiving the filter cake.

The filter press 1 further comprises a movable head 8 which is adapted to transport the filter plate assembly arranged on the side beams in a longitudinal direction of the filter press. In this embodiment the movable head comprises a carriage 11 wherein said carriage is adapted to move along the side beams by means of a drive unit 20 and a linear transmission 50. The carriage 11 is provided with supporting guide rollers 12 which are adapted to roll on the side beams. The guide rollers 12 are arranged in pairs to roll on the upper and lower horizontal contact surfaces of the side beams, respectively.

The movable head 8 further comprises a press plate 13 which is directed towards the filter plate assembly and a rear side 14 directed away from the filter plate assembly. The press plate 13 is preferably substantially rectangular or square. In this embodiment the outline of the press plate is provided with recesses 15 on the vertical sides to provide space for the side beams 4 and a linear transmission 50.

With this simple arrangement, the movable head 8 can travel at high and adjustable speeds and efficiently transport a large number of filter plates along the side beams 4.

Figure 3:
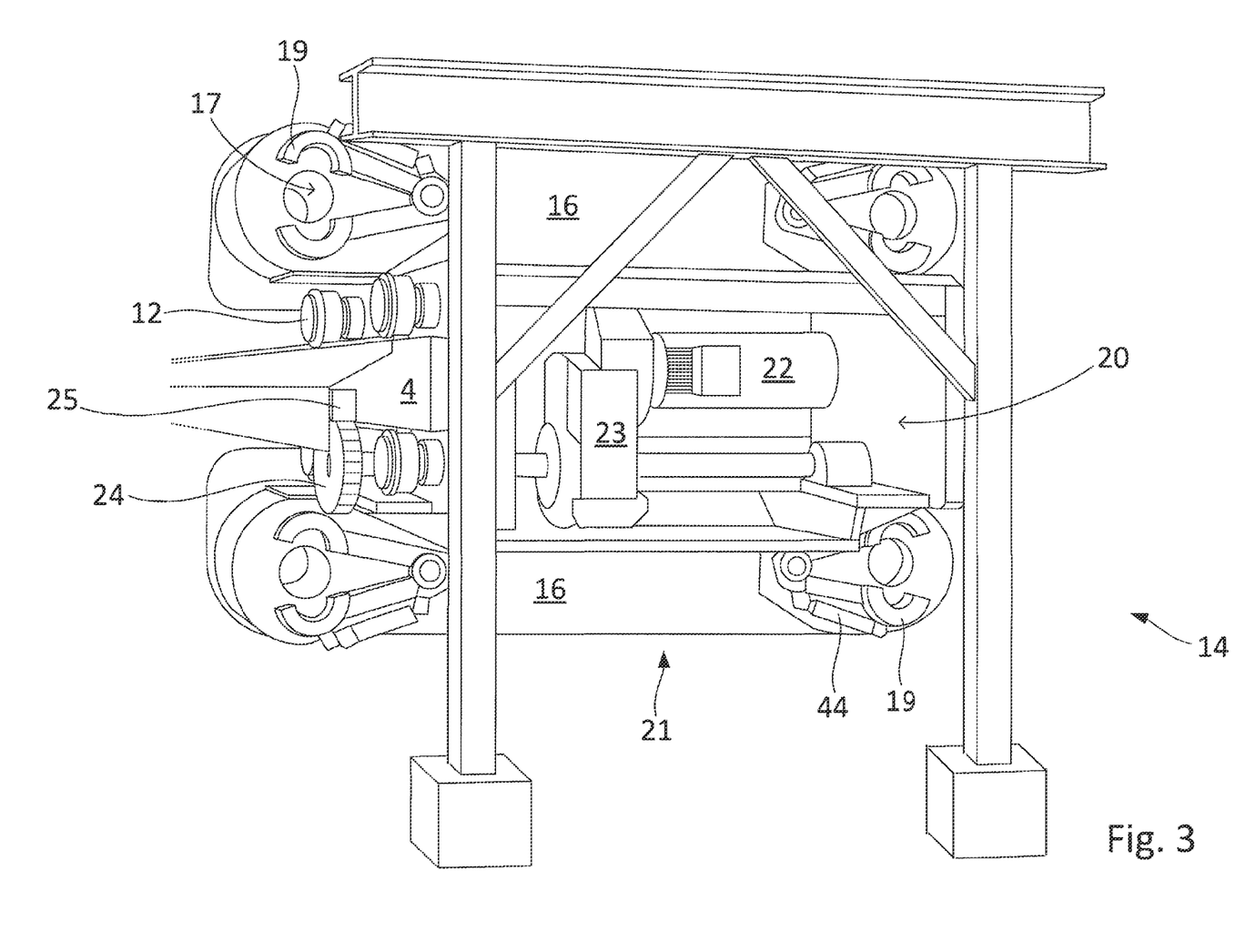
FIG. 3 illustrates a perspective view of the rear end of the movable head of the filter press according to one embodiment of the invention.

FIG. 3 illustrates a perspective view of the rear end of the movable head 8 of the filter press according to the embodiment shown in FIGS. 1 and 2.

The rear side 14 of the movable head is further provided with at least one support section 16 provided with at least one locking device 19 and at least one through hole 17 for receiving a locking element 18 connected to the press system 26. In this embodiment (FIG. 3), the movable head comprises two support sections 16 which are provided with four through holes 17 and four locking devices 19.

The movable head 8 is adapted to be movable along the longitudinal axis of the side beams 4 with the aid of at least one drive unit 20 and linear transmission 50. The carriage 11 comprises a shaft and bearing house 21 wherein the drive unit 20 comprising an electric motor 22 and gearbox 23 is mounted.

The linear transmission 50 comprises at least one gear wheel 24 adapted to mesh with at least one toothed rack 25. In this embodiment the at least one gear wheel 24 is mounted on the carriage 11 and the at least one toothed rack 25 is mounted on the side beams 4.

In this embodiment the drive unit 20 is arranged on the carriage 11 such that the drive unit moves with the carriage. The at least one toothed rack 25 may be mounted on a side beam 4 of the frame and the at least one gear wheel 24 is connected to the gearbox 23 and an electrical motor 22. When the drive unit is operation the gear wheel is meshed with the toothed rack to move the carriage 11 along the side beams.

The drive unit 20 is adapted to drive at least one gear wheel 24 that meshes with at least one toothed rack 25 mounted on the side beams. The toothed rack 25 has teeth facing downwards. The drive unit 20 drives the movable head 8 by the toothed rack along the side beams towards the filter plate assembly 6 and consequently moves the filter plate assembly 6 from an open position (illustrated in FIG. 1) to an operation position where the filter plates are close to each other and the filtration process may be performed (illustrated in FIG. 2).

Figure 4:
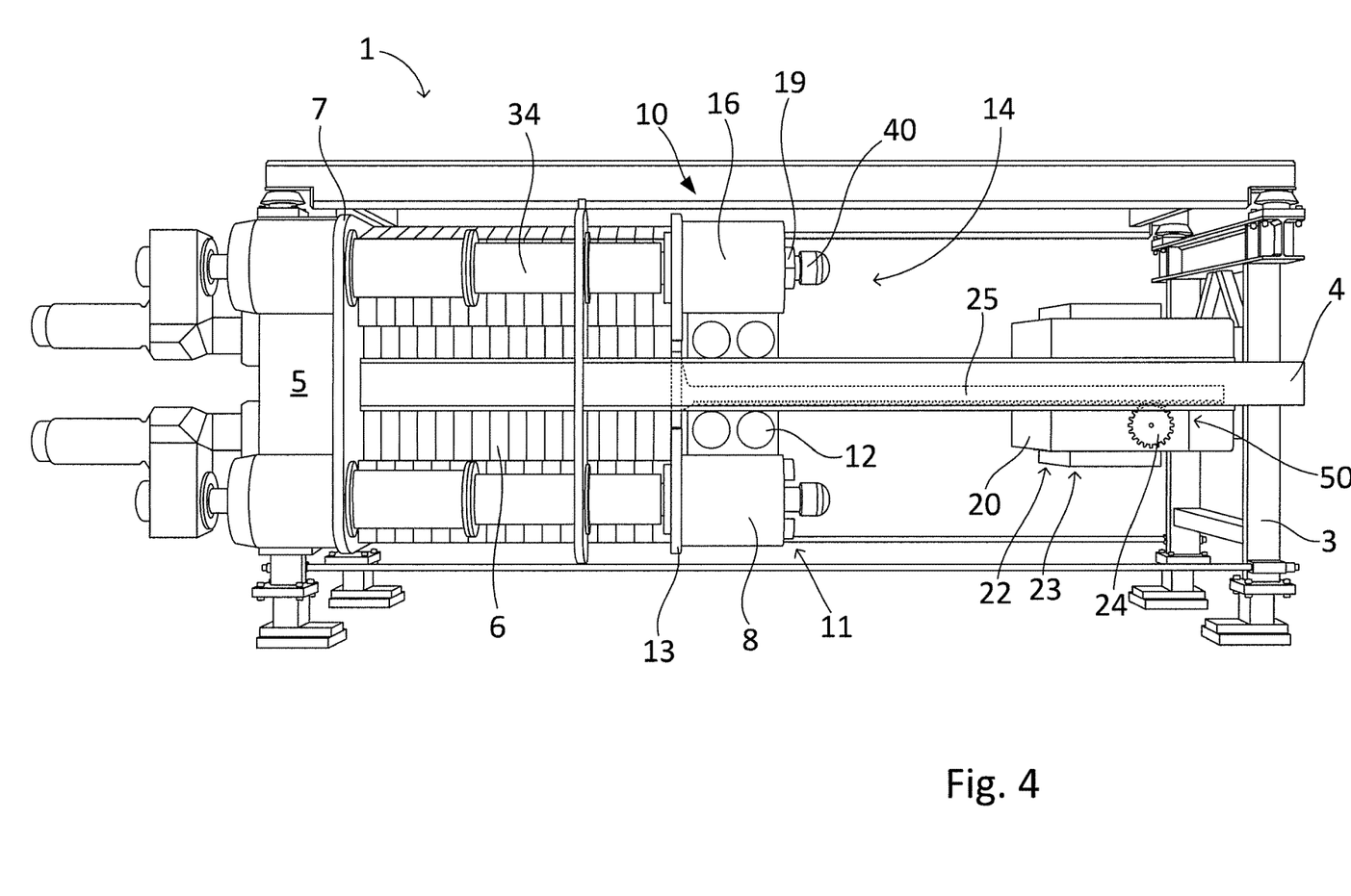
FIG. 4 illustrates another embodiment of the filter press, where the drive unit of the movable head is stationary arranged.

FIG. 4 illustrates another embodiment of the filter press wherein the carriage 11 carries the press plate and locking devices 19 but not the drive unit 20. In this embodiment the drive unit 20 is stationary arranged and the press plate 13 is moved by the carriage 11. In this embodiment the at least one gear wheel 24 is fixed mounted on the side beam and the at least one toothed rack is attached to the carriage 11. The at least one toothed rack is arranged to be displaced with the carriage 11 and the gear wheel fixed mounted to be connected to the drive unit 20. One end of the at least one toothed rack 25 is mounted to the carriage 11 and the other end of the at least one toothed rack is arranged to interact with the gear wheel 24 connected to the drive unit. When the drive unit is in operation the stationary gear wheel meshes 24 with the movable toothed rack to move the carriage along the side beams. This is advantageous in that the carriage only carries the press plate, thus the carriage may be moved in a high and variable speed along the side beams. With this simple arrangement, the movable head can travel at high speeds and transport a large number of filter plates along the side beams.

FIG. 1-3 further illustrates that the filter press comprises press system 26 and locking system 10. The locking system 10 is adapted to lock the movable head in an operation position prior to the filtration process. The filter press is locked when the locking system 10 is activated and in operation. When the locking system 10 is in operation the press system 26 may be activated to exert a pulling force, a closing pressure, on the filter plates thereby pressing them against each other and sealing them tightly together to ensure that the filtration process can be performed without leakage.

The press system 26 according to the invention comprises at least one actuator adapted for converting rotational motion to linear motion. FIG. 1 schematically illustrates an actuator 27 according to one or more embodiments of the present invention. In the press system 26 the actuator 27 converts rotary drive supplied by electrical drive means 29 into an axially directed force which is applied to the filter plate assembly 6 during filtration. In this embodiment, the filter press 1 comprises four actuators 27, one pair of actuators are arranged on each vertical side of said filter plate assembly.

The press system 26 comprises a bearing house 28 and electrical drive means 29. The bearing house 28 is arranged inside the stationary end 5. The electrical drive means 29, an electrical motor, is provided on the side of the stationary end 5 which is directed away from the filter press. The actuators 27 are connected to the electrical drive means 29.

In this embodiment each actuator 27 extends from the stationary end 5 in the longitudinal direction of the filter press 1 towards the movable head.

In the embodiment shown in FIG. 1, each actuator 27 of the press system 26 comprise a planetary roller screw assembly 31 (which is illustrated in dashed lines in FIG. 1) and an actuator housing 45. The actuator 27 is adapted to convert rotary drive by the electrical drive means 29 into an axially directed force that acts on the filter plates 6 by means of the press plate 13 to close and seal the filter plate assembly.

Figure 5:
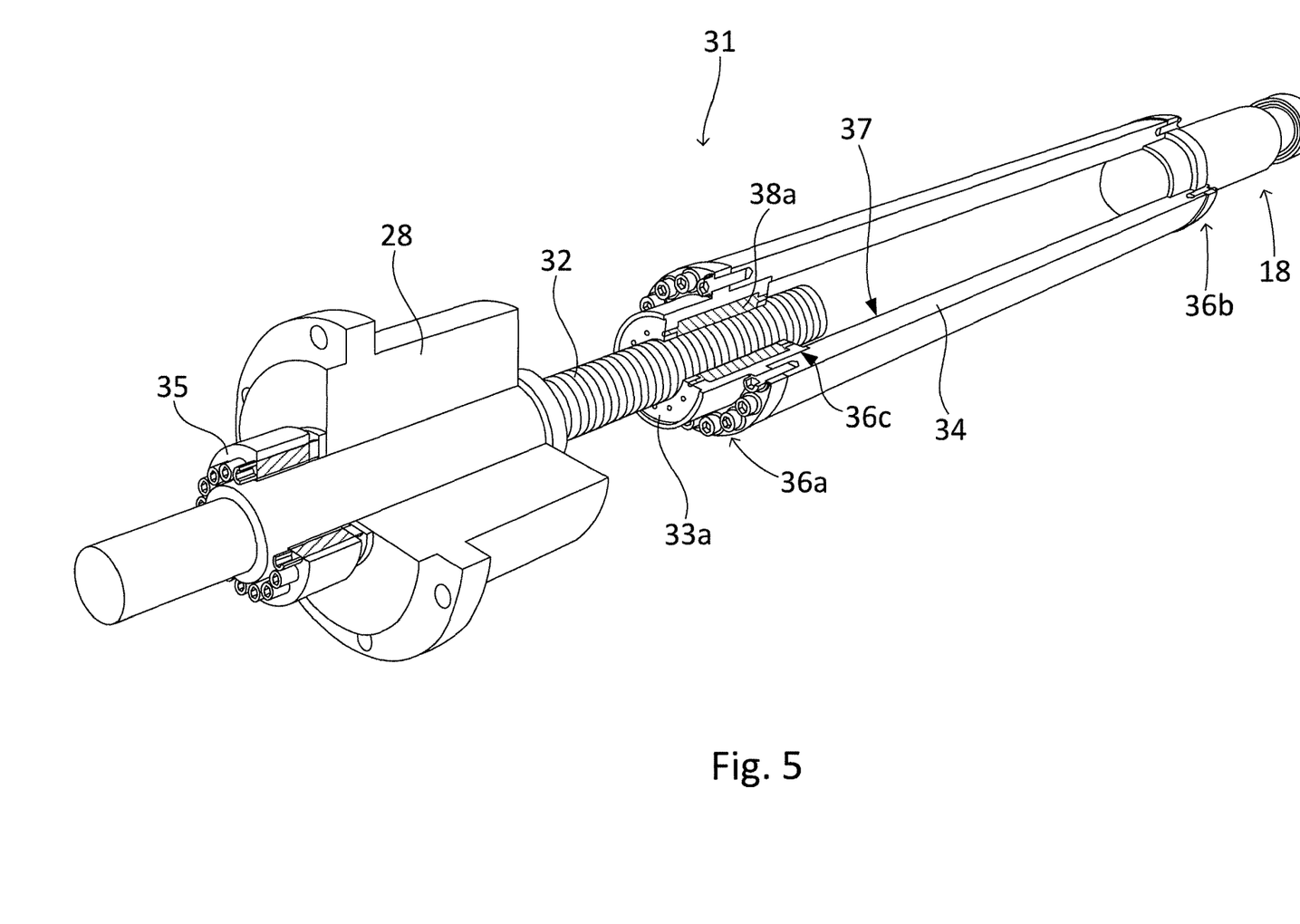
FIG. 5 illustrates the actuator configured as a planetary roller screw assembly according to one embodiment of the invention.

FIG. 5 illustrates one embodiment of the actuator 27 which is configured as a planetary roller screw assembly 31. In this embodiment, the planetary roller screw assembly 31 comprises a main threaded shaft 32, a planetary roller nut 33a and an extension element 34. The main threaded shaft 32, also called the planetary roller screw shaft 32, is connected to the electrical drive means 29 via the bearing house 28. The main threaded shaft 32 is subjected to large axial forces, therefore preferably a multi-jack bolt tensioner 35 is used for attaching the main threaded planetary shaft 32 to the bearing house 28. The actuator housing 45 is adapted to cover the main threaded shaft, the planetary nut and at least a part of the extension element 34.

The planetary roller nut 33a, comprises an arrangement of threaded rollers 38a which interacts with the threaded planetary shaft 32 to convert rotational motion into linear motion. Specifically, the threads on the planetary shaft 32 and on the threaded rollers 38a causes the planetary roller nut 33a to be displaced in the axial direction along the axis of the main threaded shaft in response to rotary drive of the threaded main shaft 32 such that an axially directed force, a pressure force, is generated or removed by the press system 26. The moving direction of the planetary roller nut 33a is determined by the rotational direction of the main threaded shaft.

When the press system 26 is activated and in operation, the threaded planetary shaft 32 is driven in a first direction by the electrical motor such that the actuator 27 exerts a pulling force, a closing pressure, on the filter plate assembly to seal the assembly.

When the filtration process is completed, the rotary driving direction is changed and the shaft 32 is driven in the opposite direction to generate a pushing force to remove the pressure from the filter plate assembly 6. The operation to close and open the filter plate assembly 6 is thus easily achieved by changing direction of rotation of the main threaded shaft 32 which contributes to reducing the cycle times.

Figure 6:
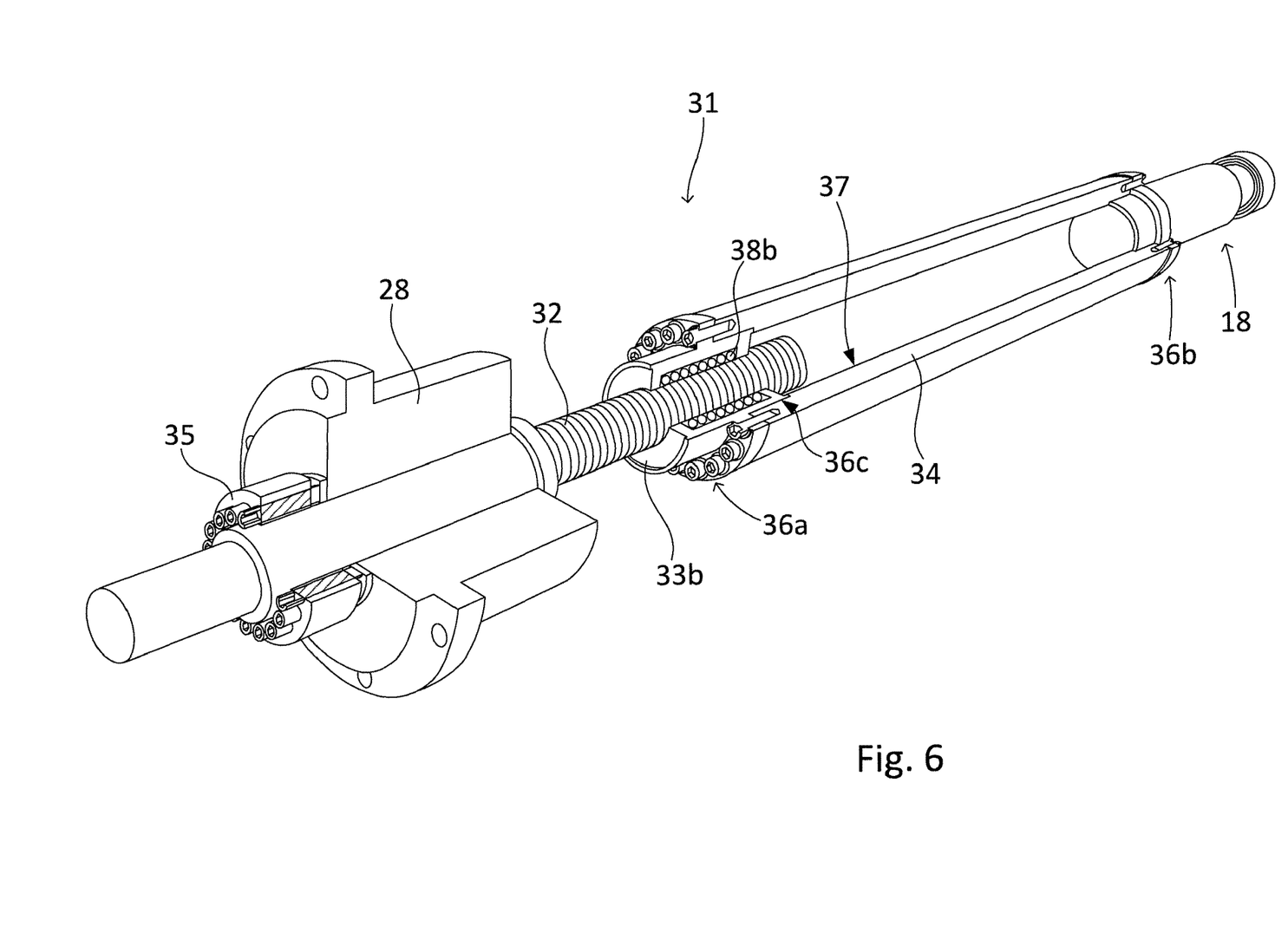
FIG. 6 illustrates the actuator configured as a planetary ball screw assembly according to one embodiment of the invention.

FIG. 6 illustrates another embodiment of the actuator 27 which is configured as a planetary ball screw assembly. In this embodiment, the planetary ball screw assembly comprises a main threaded shaft 32, a planetary ball nut 33b and an extension element 34. The planetary ball screw assembly provides the same function as the planetary roller screw assembly and is therefore not further described herein.

FIGS. 1, 2, 5 and 6 further shows an extension member 34 fixedly attached to the planetary nut of the actuator 27 in order to perform the same movement as the planetary nut 33a, 33b. The extension member comprises a longitudinally extended cylindrically formed shell having a first end 36a and a projecting end 36b. Preferably the extension member is concentrically arranged with the planetary screw shaft. The inside perimeter 37 of the first end 36a of the extension member is fixedly attached to the outside circumference 36c of the planetary nut. The extension member 34 extends from the planetary nut towards the locking system and the movable head 8. The extension member 34 is directed towards the movable head 8. The projecting end 36b of the extension member is connected to locking element 18.

FIG. 5 shows that the planetary roller nut 33a is attached to the extension element 34, thus when the planetary roller nut is displaced along the threaded main shaft 32, the extension element 34 is also axially displaced in the same direction. Accordingly, the position of the extension element 34 can be adjusted by rotating the main threaded shaft 32 in the appropriate direction. Because of the number of threaded rollers 38a which surround the main threaded shaft 32 and which are in continuous contact with main threaded shaft, the axially directed actuating force derived from the rotary drive is applied on a greater surface area, thus a large amount of thrust is provided to effectively close and tighten the filter plate assembly. A very high closing pressure may therefore be achieved by the press system 26 according to the present invention. The filter plate assembly 6 arranged between the stationary end 5 and the movable head 8 are thus tightly sealed together. In addition, the cycle time is significantly reduced and substantial energy savings can be achieved in comparison to conventional filter presses since both the movable head and the press system are driven by electrical drive means. Another advantage is that no hydraulic cylinders are used for transport of the filter plates or for closing of the filter press, thus the filter press described herein is environmentally sustainable since no hydraulic oil is required to perform the filtration process.

FIGS. 1 and 2 further show a fixing member 30 which is attached to the side beam 4 of the frame 3. The fixing member 30 is connected to the planetary nut 33a, 33b or the extension member 34. The fixing member 30 is preferably adapted to permit axial displacement of the planetary nut and the extension member along the axial direction the planetary shaft. The purpose of the fixing member 30 is to prevent the planetary nut or the extension member from rotating when the press system is activated, such that the electrically driven actuator may generate an axially directed force to pull the filter plates towards the stationary end 5.

FIG. 1-3 further show a locking system 10 which is adapted to interconnect the movable head 8 and the stationary end 5. The locking system provides that the movable head 8 and the stationary end 5 can be releasable locked together. In particular the locking system provides that the movable head 8 maybe locked to the press system 26.

The locking system 10 comprises at least one locking element 18 and at least one locking device 19, wherein said locking device 19 is adapted to engage around said locking element. In this embodiment of the invention (FIG. 1-3) the locking system 10 comprises four locking element 18 and four clamping devices 19.

FIG. 1 and FIG. 2 illustrate that the locking element 18 is attached to the actuator 27 of the press system. The locking element 18 comprises a rod member 39 having a rod end portion 40 and a recess 41 preferably provided around the circumference of the rod member and a stop member 42 arranged on the end projecting end of the clam-connector. The locking element 18 projects towards the movable head, and is specifically aligned with a through hole 17 in said movable head, and arranged to cooperate with the locking element.

The locking element 18 is configured to be inserted into said through hole 17. A contact surface 43 on the movable head may abut the stop member 42. The locking element 18 has a cross section corresponding to the through hole 17 of the movable head 8 to align the locking element 18 correctly with the locking device 19 arranged on the second side of the movable head. The locking element 18 can thus mesh exactly with the locking device 19.

In this embodiment (FIG. 3) each locking device 19 is arranged on the rear side 14 of the movable head and at respective through hole 17. The locking device is configured as a pair of clamping jaws adapted to releasable clamp around the rod end portion 40 and to engage with the recess 41 in the rod member thereby forming a locking connection between the locking element 18 and the movable head.

The locking device 19 is shifted between an open and closed state using a lever 44. The lever is extendable in a direction along the length of the locking device and will force the locking device into the closed state when fully extended. When the lever is fully retracted the locking device is in turn placed in the open state.

When the locking device is closed, the filter press is in position for operation. The filter plate assembly 6 may then be closed by the press system 26 and the filtration process can be performed.

When the locking device is shifted to the open state again, the movable head and the filter plates are once again movable in the longitudinal direction of the filter press away from the stationary end.

In order to remove the filter cake upon completion of filtration, the filter plate assembly must be pulled apart. For this purpose, the pressure force on the filter plate assembly is reduced by the actuator. The locking system 10 is unlocked by opening the locking device 19. The movable head may then pull the filter plates apart and transport the filter plates from the operation position to an open position of the filter plates.

Figure 7:
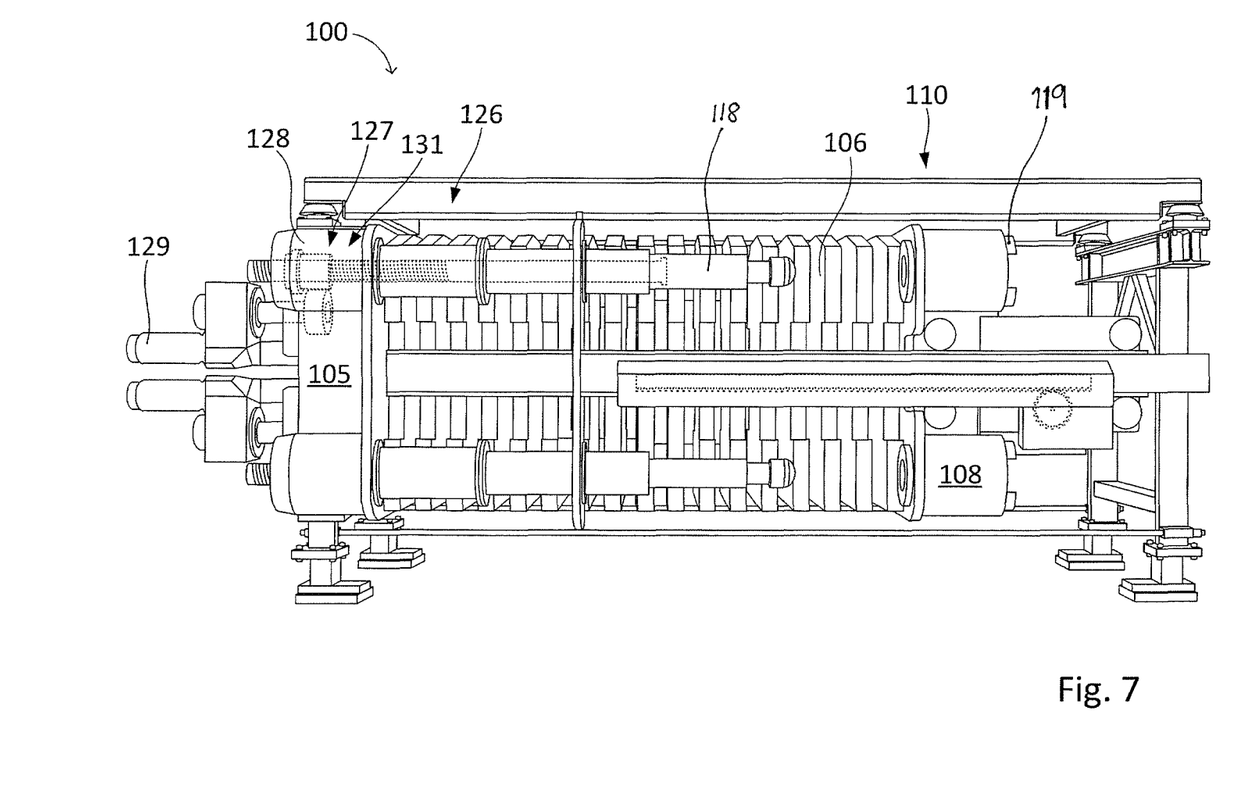
FIG. 7 illustrates another embodiment of the filter press, wherein the planetary nut is arranged in the stationary end of the filter press.

FIG. 7 illustrates another embodiment of the filter press 100 having filter plates 106, a movable head 108, a locking element 118, at least one locking device 119, press system 126 and actuator 127 configured as a planetary screw assembly 131. In this embodiment the planetary nut is attached to the stationary end 105 inside the housing 128 and the planetary shaft is arranged to move in the axial direction. The planetary nut 133 is arranged to be rotated, driven by electrical driving means 129 attached to the stationary end 105. The filter press further comprises a locking system 110 of same type as filter press 1. The press system 126 operates in similar manner as the previously described press system 26. As illustrated, the filter press 100 comprises further features corresponding to features of filter press 1 which are therefore not described here.

Figure 8:
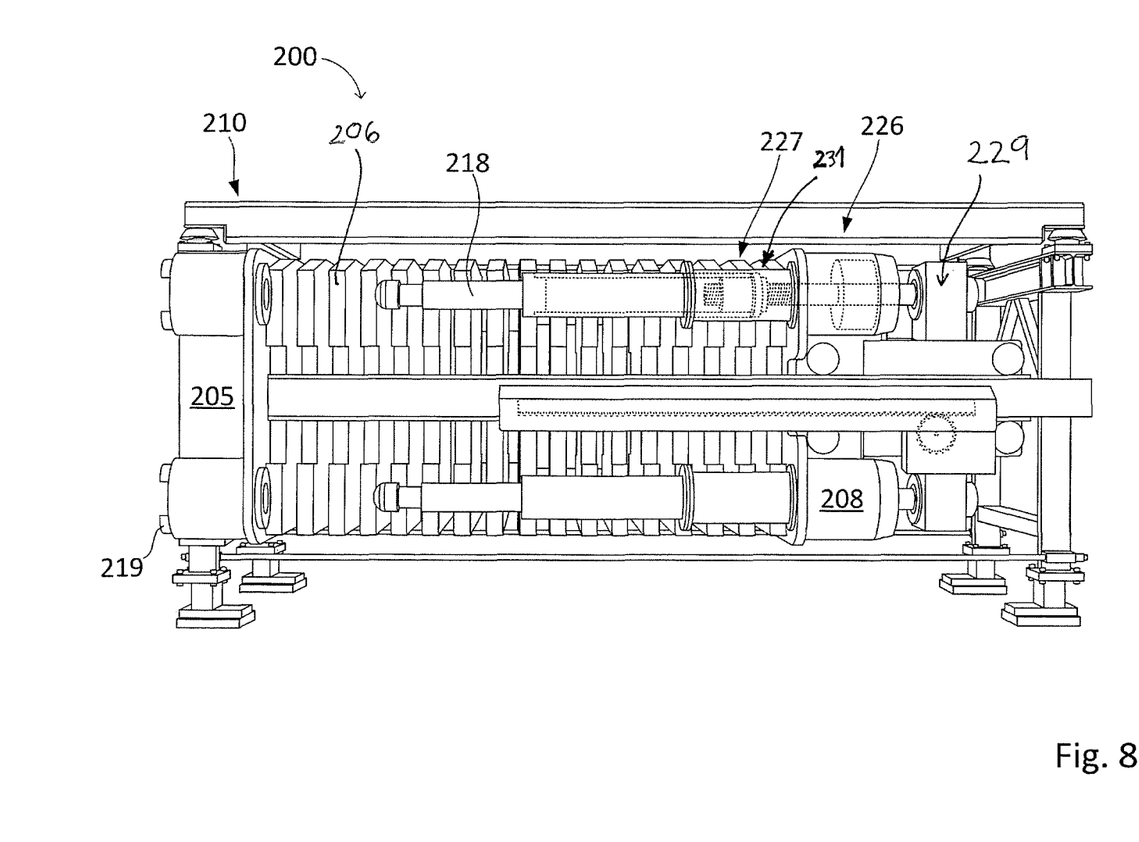
FIG. 8 illustrates another embodiment of the filter press, wherein the movable head comprises the press system.

FIG. 8 shows another embodiment of the filter press 200 with filter plates 206 comprising a press system 226 with an actuator 227 configured as a planetary screw assembly 231 extends from a movable head 208 in the longitudinal direction of the filter press towards a stationary end 205. The press system comprises electrical drive means 229 attached to the movable head 208. The filter press further comprises a locking system 210 comprising locking device 219 and locking element 218. The filter press 200 operates in similar manner as the previously described filter press 1. As illustrated, the filter press 200 comprises further features corresponding to features of filter press 1 which are therefore not described here.

The filter press according to the embodiment illustrated in FIG. 1-3 operates as follows:

The movable head 8 is located first of all in an open position farthest away from the stationary end 5—the open position. The filter press 1 is completely open and the filter plates 6 are spread out.

In the next step the movable head 8 is driven by electrical drive means 29 to move towards the stationary end 6 and bring the filter plates together and closes the filter press as it does so. The filter plates are transported along the side beams and the filter press reaches a closed but not locked position. Locking element 18 are received by the locking device 19 arranged on the movable head 8.

The locking system 10 is then activated whereby the locking device is closed to achieve a locking connection between the locking element 18 and the locking device 19.

In the next step, the press system 26 is activated whereby the electrically driven actuator 27, the planetary screw assembly, exerts a pulling force, a closing pressure on the movable head whereby the filter press is closed. The filtration process can thereafter be performed.

In order to remove the filter cake upon completion of filtration, the filter plates must be pulled apart. For this purpose, first the planetary screw assembly reduces the pressure by exerting a pushing force on the movable head. Thereafter the locking system 10 is deactivated and the locking device 19 is opened.

The drive unit of the movable head is activated such that the movable head is moved from the operation position by means of the linear transmission 50. The outermost filter plate of the series of filter plates facing the movable plate is connected to the movable plate, and all other filter plates are connected to this outermost filter plate, for example by chains. Thus, the movement of the movable head 8 causes the filter plates to be pulled apart from one another, and the filter cakes drops to down to collecting chute under the force of gravity.

The filter press according to the invention thus provides the necessary pressure for performing the filtration process on the one hand, but also allows the filter plates to be opened and closed rapidly on the other hand.

The skilled person realizes that a number of modifications of the embodiments described herein are possible without departing from the scope of the invention, which is defined in the appended claims.

For instance, the filter plates may have a rectangular or square shape. The locking device may be placed and arranged differently as long as it interconnects the movable head and the stationary head and locks the movable head to the press system. The inlets and outlets of the filter plates may be placed at any suitable location on the filter plates. The electrical drive means of the present invention may comprise a hydraulic motor driven by an electrical hydraulic pump. The advantage of reduced amounts of hydraulic oil is maintained with this solution since the volume of the hydraulic can be kept to a minimum with this solution.

Naturally, any suitable shape and size of the components in the filter press is applicable without departing from the scope of the invention.

The foregoing description of the preferred embodiments has been furnished for illustrative and descriptive purposes. It is not intended to be exhaustive, or to limit the embodiments to the variants described. Many modifications and variations will obviously be apparent to one skilled in the art. The embodiments have been chosen and described in order to best explicate principles and practical applications, and to thereby enable one skilled in the art to understand the embodiments in terms of its various embodiments and with the various modifications that are applicable to its intended use. The components and features specified above may, within the framework of the embodiments, be combined between different embodiments specified.

The invention claimed is:

1. A filter press for separating solid components from liquid components of a slurry, comprising:
   a press frame;
   side beams;
   a plurality of filter plates oriented at right angles to a longitudinal direction of the side beams wherein said filter plates are adapted to move along said side beams;
   a stationary end arranged on or near one end of the side beams;
   a movable head adapted to transport said filter plates along the side beams; and
   a press system adapted to exert a closing pressure on said filter plates to press the filter plates against each other, wherein the press system comprises at least one electrically driven actuator driven by an electrical drive means to generate an axially directed force which is exerted on the filter plates by means of the movable head, wherein said actuator comprises a planetary screw assembly, and an electrical drive unit is arranged to drive said movable head during transportation of the filter plates, wherein said electrical drive unit is separate from said electrically driven actuator and said electrical drive means.

2. The filter press according to claim 1, wherein said actuator is adapted to convert rotary drive into an axially directed force.

3. The filter press according to claim 1, wherein said actuator is adapted to convert rotary drive into an axially directed pull force.

4. The filter press according to claim 1 wherein said planetary screw assembly comprises a threaded planetary screw shaft and a planetary nut adapted to interact with the planetary screw shaft, and the planetary screw shaft is arranged in a fixed position and the planetary nut is arranged to be movable in the longitudinal direction, such that the planetary nut is displaced in an axial direction of the planetary screw shaft in response to rotary drive of the threaded planetary screw shaft.

5. The filter press according to claim 4 wherein said planetary nut is arranged to be non-rotatable when the press system is in operation.

6. The filter press according to claim 1 wherein the planetary screw assembly comprises a threaded planetary screw shaft and a planetary nut adapted to interact with the planetary screw shaft, and the planetary nut is arranged to be in a fixed position and the planetary screw shaft is arranged to be movable in the longitudinal direction, such that the planetary screw shaft is displaced in an axial direction relative to said planetary nut in response to rotary drive of the planetary nut.

7. The filter press according to claim 6 wherein said threaded planetary screw shaft is arranged to be non-rotatable when the press system is in operation.

8. The filter press according to claim 4 wherein said planetary screw assembly comprises a planetary roller screw assembly wherein the planetary nut comprises a planetary roller nut having an arrangement of rollers adapted to interact with the threaded planetary screw shaft.

9. The filter press according to claim 4 wherein said planetary screw assembly comprises a planetary ball screw assembly wherein the planetary nut comprises a planetary ball nut having an arrangement of balls adapted to interact with the threaded planetary screw shaft.

10. The filter press according claim 8, wherein said press system further comprises an extension member fixedly attached to the planetary nut in order to perform the same movement as the planetary nut.

11. The filter press according to claim 10 wherein said extension member is adapted to be axially displaceable together with the planetary nut.

12. The filter press according to claim 8 wherein the actuator further comprises an extension member fixedly attached to the planetary nut and wherein said extension member is adapted to be stationary together with the planetary nut.

13. The filter press according to claim 8 further comprising means for preventing the planetary nut from rotating.

14. The filter press according to claim 13 wherein said means for preventing the planetary nut from rotating comprises a fixing member attached to the frame, said fixing member being adapted to permit axial displacement of the planetary nut.

15. The filter press according to claim 1 wherein said press system is mounted on the stationary end.

16. The filter press according to claim 1 wherein said press system is mounted on the movable head.

17. The filter press according to claim 1 wherein the movable head comprises a carriage and a press plate directed towards the filter plates, wherein said carriage is adapted to move along the side beams by means of a drive unit and a linear transmission.

18. The filter press according to claim 17 further comprising that said drive unit is arranged on the carriage and that the linear transmission comprises at least one gear wheel mounted on the carriage and at least one toothed rack mounted on the side beam, wherein said drive unit is adapted to drive the movable head along the side beams by means of the linear transmission.

19. The filter press according to claim 17 further comprising that the drive unit is stationary arranged on the press frame and that the linear transmission comprises at least one gear wheel mounted on the frame and at least one toothed rack mounted on the carriage, wherein said drive unit is adapted to drive the movable head along the side beams by means of the linear transmission.

20. The filter press according to claim 1 further comprising a locking system which is adapted to interconnect the movable head and the stationary end.

21. The filter press according to claim 1 further comprising a locking system adapted to lock the movable head into engagement with the press system.

22. The filter press according claim 1 wherein said actuator is connected to the movable head in order to transmit the axially directed force generated by the actuator to the movable head and the filter plates.

23. The filter press according to claim 20, wherein said locking system comprises at least one locking element and at least one locking device and wherein said locking device is adapted to form a locking engagement with said locking element.

24. The filter press according to claim 23 wherein said locking element is connected to the actuator, and where the locking element comprises a notch, and said locking device is adapted to engage with said notch.

25. The filter press according claim 20 wherein said locking system is configured to prevent the planetary nut from rotating.

26. The filter press according to claim 23 wherein said locking device is mounted on the movable head.

27. The filter press according to claim 23 wherein said locking device is mounted on the stationary end.

28. A method for separating solid components from liquid components of a slurry using a filter press comprising a plurality of filter plates, said method comprising the steps of:
placing said filter press in an operating position by transporting said filter plates towards a stationary end by a movable head;
exerting a closing pressure on said filter plates by a press system that is adapted to press said filter plates against each other by electrically driving of at least one actuator comprising at least one planetary screw assembly and adapted to generate an axially directed force which is exerted on the filter plates by means of the movable head;
injecting the slurry between the filter plates; and
separating the solid components from the liquid components of the slurry located between the filter plates,
wherein the step of exerting a closing pressure on said filter plates by the press system comprises driving said at least one planetary screw assembly by an electrical drive means, driving said movable head during transportation of the filter plates with an electrical drive unit, said electrical drive unit being separate from said electrically driven actuator and said electrical drive means.

29. The method according to claim 28, wherein the step of exerting a closing pressure on said filter plates comprises displacing a planetary nut in an axial direction of a threaded planetary screw shaft in response to rotary drive of the planetary screw shaft.

30. The method according to claim 28, wherein the step of exerting a closing pressure on said filter plates comprises displacing a planetary screw shaft in an axial direction relative to a planetary nut in response to rotary drive of the planetary nut.

31. The method according to claim 28, wherein the step of exerting a closing pressure on said filter plates comprises electrically driving of at least two actuators, and exerting axially directed forces of equal magnitude on the filter plates by said actuators.

32. The method according to claim 28, wherein the step of exerting a closing pressure on said filter plates comprises electrically driving of at least two actuators, and exerting axially directed forces of different magnitude on the filter plates by said actuators.

33. The method according to claim 28, further comprising the step of locking the movable head in an operating position by a locking system.

34. The method according to claim 33, wherein the step of the step of locking comprises forming a locking engagement between at least one locking element connected to the press system and at least one locking device attached to the movable head.

* * * * *